Nov. 24, 1970  C. I. BOKSJÖ  3,543,129
POWER TRANSMISSION EQUIPMENT FOR HIGH VOLTAGE DIRECT CURRENT
Filed June 28, 1968
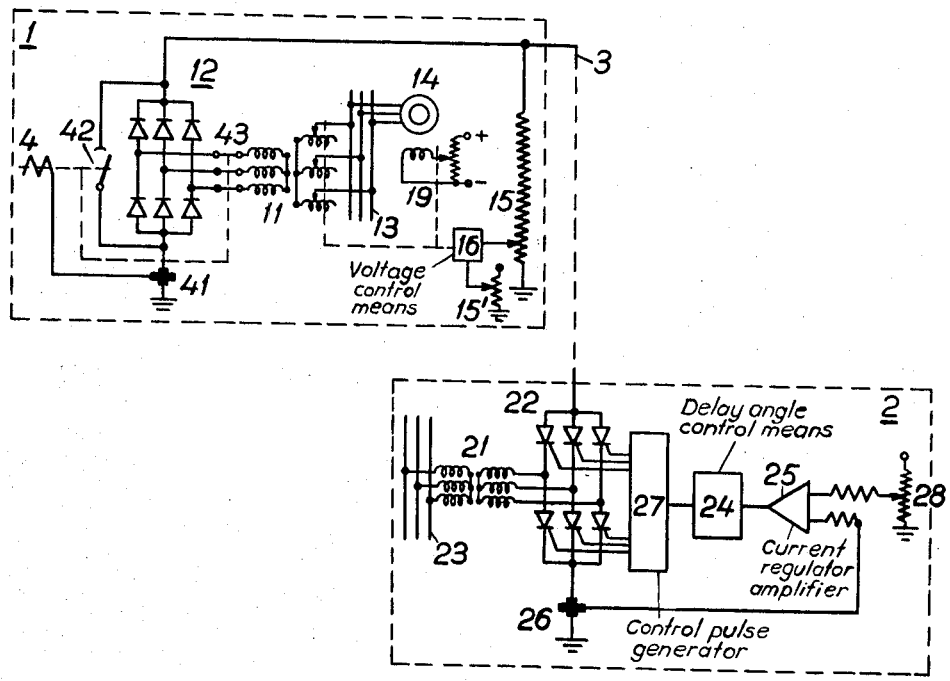
INVENTOR.
CARL INGVAR BOKSJÖ
BY

United States Patent Office 3,543,129
Patented Nov. 24, 1970

3,543,129
POWER TRANSMISSION EQUIPMENT FOR HIGH VOLTAGE DIRECT CURRENT
Carl Ingvar Boksjö, Ludvika, Sweden, assignor to Allmanna Svenska Elektriska Aktiebolaget, Vasteras, Sweden, a corporation of Sweden
Filed June 28, 1968, Ser. No. 741,074
Int. Cl. H02m 1/18, 5/42
U.S. Cl. 321—2
3 Claims

ABSTRACT OF THE DISCLOSURE

A high voltage direct current power transmission plant composed of a rectifier station and an inverter station connected by a transmission line. The rectifier station is provided with control means for controlling its direct voltage with respect to a certain desired line voltage, which includes an arrangement for measuring the transmitted line voltage and means responsive to the line voltage measuring arrangement for controlling the feeding AC voltage of the station, the delay angle of the rectifiers or the like. The inverter station is provided with a known type of control means for adjusting some variable of the AC network such as transmitted current, power or frequency.

BACKGROUND OF THE INVENTION

Field of the invention

The present invention relates to a power transmission plant for high voltage direct current comprising a rectifier station and an inverter station connected by a transmission line.

The prior art

In such a power transmission plant the rectifier station and the inverter station are normally provided with practically equal control systems comprising a delay angle control means for the rectifiers of the stations, which delay angle control means are controlled from a regulator in each station. These regulators are normally preset according to a desired current value so that the current order of the rectifier station exceeds the current order of the inverter station by a certain amount, the so-called current marginal. Normally the stations are connected by a teletransmission link and the same current order is sent to both stations and in the inverter station a magnitude corresponding to the desired current marginal is subtracted from said transmitted current order. The current order can be given directly as a current order or it can be derived from another desired transmission magnitude, for instance a certain desired transmitted power, and the system operates in such a way that each station tries to control its voltage so that the current order of the proper station is fulfilled. Balance is obtained when one of the stations has reached its maximum direct voltage while the other station has set its direct voltage in relation hereto so that the transmitted direct current corresponds to the current order of said station. Thus the latter station dictates the transmitted current while the former by its maximum direct voltage dictates the transmission voltage. Thus the control systems of the two stations cooperate through the above cycle.

The above principle gives a stable control but the teletransmission link between the control systems is a weak point in the plant.

SUMMARY OF THE INVENTION

The present invention relates to a transmission plant where said tele-transmission link is omitted and a transmission plant according to the invention is characterised in that the rectifier station is only controlled with respect to a certain desired direct voltage while the inverter station in a way known per se is provided with a control system in order to dictate a certain transmitted magnitude such as a transmitted current or power or the frequency of the AC network of the inverter station.

In this way the rectifier station independently of the inverter station dictates a certain desired line voltage while the inverter adjusts its direct voltage to such a value that the desired current or power is obtained in this station. The control system of the inverter station is therefore, as mentioned, suitably made according to a previously known principle.

The rectifier station is provided with uncontrolled rectifiers so that a fixed relation between the alternating voltage and the direct voltage of the two sides of the rectifier connection of the station is obtained. The voltage regulation of the rectifier station thus is accomplished from the voltage regulation of the AC network connected to the rectifier. If a possibility of a voltage control in the rectifier station itself is desired, the converter-transformer of the station could be provided with a tap switch controlled by a voltage-sensitive means connected to the transmission line so that a certain desired transmission voltage is secured. If that or those generators feeding the AC side of the rectifier station are at free disposal the voltage of said generators could be controlled by the DC side of the rectifier station by connecting the output side of said voltage-sensitive means to the exciter windings of the generators.

BRIEF DESCRIPTION OF THE DRAWINGS

The invention will be further described with reference to the accompanying drawing where the sole figure shows a direct current plant according to the invention.

DESCRIPTION OF THE PREFERRED EMBODIMENTS

The drawing shows a direct current transmission plant comprising two converter stations, a rectifier station 1 and an inverter station 2, one pair of terminals of which are connected through a transmission line 3, while the other terminals of the stations are connected to earth. The rectifier station comprises a converter-transformer 11, possibly provided with a tap selector for varying the ratio of turns of the transformer, and a rectifier bridge connection 12 provided with uncontrolled rectifiers. Each of these rectifiers could suitably be built up of a number of series and/or parallel connected semi-conductor diodes. In this way a fixed ratio of conversion between the alternating voltage of the rectifier side of the converter-transformer 11 and the direct voltage of the transmission line 3 is obtained. The converter-transformer 11 is connected to a feeding AC network 13 fed from a synchronous generator 14 the voltage of which could possibly be controlled by means of its exciting winding 19 connected to a potentiometer.

Possibly in a construction according to the drawing the voltage control of the rectifier station could be limited to the voltage control of the AC network 13–14. If, however, voltage control in the rectifier station itself is desired, the converter-transformer 11 could as mentioned be made with a variable ratio of turns by means of the tap-selector. Between the transmission line 3 and earth is inserted a voltage divider 15 and to the lower part of this is connected a voltage-sensitive means 16 to the input side of which is also connected a potentiometer 15' for presetting a desired value of the direct voltage. The output side of the voltage sensitive means 16 is arranged for control of said tap switch so that a certain transmission voltage on the line 3 is obtained.

Instead of controlling the tap switch of the transformer, provided that the generator 14 is available, the exciter system 19 of this generator could be controlled by the means 16 so that the voltage control is made in the whole AC network 13.

In the drawing is further shown an inverter station 2 comprising a rectifier bridge 22 connected to a converter-transformer 21, the output side of which is connected to the AC network 23 fed from the inverter station. In an inverter station the rectifier bridge 22 must always be provided with controlled rectifiers, the control electrodes of which are connected to a control pulse generator 27 which in its turn is controlled from a delay angle means 24 which again is controlled from a current regulator 25 in which a certain desired magnitude such as current or power is preset. In order to detect the actual transmission current, a measuring transductor 26 is inserted in the earthed conductor of the inverter and by connecting this measuring transductor to the regulator 25 the actual current value is connected to this regulator for comparing with the preset current value from a potentiometer 28.

The rectifier station 1 is provided with a by-pass means 42, for instance a by-pass switch as shown. Further, a line fault protective means 4, the input side of which comprises a measuring transductor 41, is inserted in the earth conductor of the rectifier station. While in a controlled rectifier station a line fault normally causes the control system of the rectifier station to reduce the rectifier voltage and thus the direct current, there is no such automatic current protection in the uncontrolled rectifier station. Instead the line fault protective means is arranged to close the by-pass switch 42 so that the rectifier station is by-pass connected. At the same time a circuit breaker 43 on the AC side is opened so that in case of a line fault or short circuit in the inverter station the rectifier group 12 simply is disconnected. If both stations of the transmission plant comprise a plurality of series-connected converters, a by-pass means for said converters could suitably be arranged for step-wise disconnection of the converters so that in case of a fault the line fault protective means disconnects one converter at a time. Thus, if only one converter in the inverter station is faulty, this is by-pass connected whereafter the line fault protective means 4 disconnects a converter in the rectifier station whereafter the operation can be continued with reduced transmission voltage.

The line fault protective means can be so arranged that it gives a releasing signal if the direct current exceeds a certain preset level or it can be constructed as a time derivative protective means. As semi-conductor rectifiers are very sensitive to over-currents, the latter arrangement often is preferable. Possibly a combination of a level and derivative protective means could be of value.

In the case of an added load on the output side of the inverter station this station varies its direct voltage in order to meet the varied load. This will influence the line voltage so that the rectifier station if it is provided with its own voltage control tries to maintain the desired line voltage unchanged. With rapid load variations in the inverter station the voltage control of the rectifier station may not be able to follow these conditions so that the inverter station increases the variations of its voltage which increases the difficulties for both stations while at the same time a great risk of voltage oscillations arises.

In order to avoid this it proposed to limit the rate of control of the inverter station. The regulator of the inverter station is fed on its input side with a current order from the potentiometer 28 and the current response from the measuring transductor 26. With load variations so rapid that the rectifier station cannot follow, the difference between said input magnitudes could be very great and a limitation could therefore be inserted by inserting a limit value means limiting the current order in relation to the current response. Such a limit value means can be constantly inserted or it can be arranged for connection from the rectifier station which, for this purpose, could be provided with a voltage measuring means measuring the difference between the preset and the actual direct voltage of the transmission line. If said difference exceeds a certain value, a signal is sent to the inverter station so that said limit value means is connected. In this case a tele-transmission link between the stations is necessary but, compared with the tele-transmission link mentioned in the introduction, the tele-transmission link mentioned here will only be active in those cases when the load of the inverter station varies too rapidly so that said tele-transmission link is of less importance than in previously known plants.

What is claimed is:

1. HVDC power transmission plant comprising a rectifier station and an inverter station and a transmission line connecting said stations, in which the rectifier station is provided with a rectifier connection with uncontrolled rectifiers fed with an AC voltage and control means for said AC voltage, means responsive to the difference between the actual voltage of said transmission line and a desired value of said line voltage connected to said control means to control the same, the inverter station including controlled rectifiers, and means responsive to the difference between actual transmission magnitude of the inverter station and a certain desired transmission magnitude thereof to regulate said controlled rectifiers to obtain the desired value.

2. Power transmission plant according to claim 1, in which the rectifiers of the rectifier station are provided with a by-pass connecting means, a circuit breaker between the rectifiers of the rectifier station and the AC voltage, a line fault protective means responsive to an excessive increase of the direct current of the line for closing said by-pass connecting means and opening said circuit breaker.

3. Power transmission plant according to claim 1, in which the inverter station comprises a current regulator, a presetting means for presetting a certain current order and measuring the actual current of the inverter station, means to supply to said current regulator an input signal representing the difference between said current order and the actual current, and a limiting means connected to said supply means for limiting the magnitude of said input signal.

References Cited

UNITED STATES PATENTS

| 2,208,182 | 7/1940 | Elder | 321—2 X |
| 2,684,460 | 7/1954 | Busemann | 321—13 X |
| 2,866,148 | 12/1958 | Forssell | 321—2 |
| 3,036,257 | 5/1962 | Uhlman | 321—2 |

WILLIAM H. BEHA, JR., Primary Examiner

U.S. Cl. X.R.

321—4, 11